June 30, 1931.  D. WILLMAN  1,811,989
ILLUMINATED LICENSE HOLDER
Filed March 20, 1929
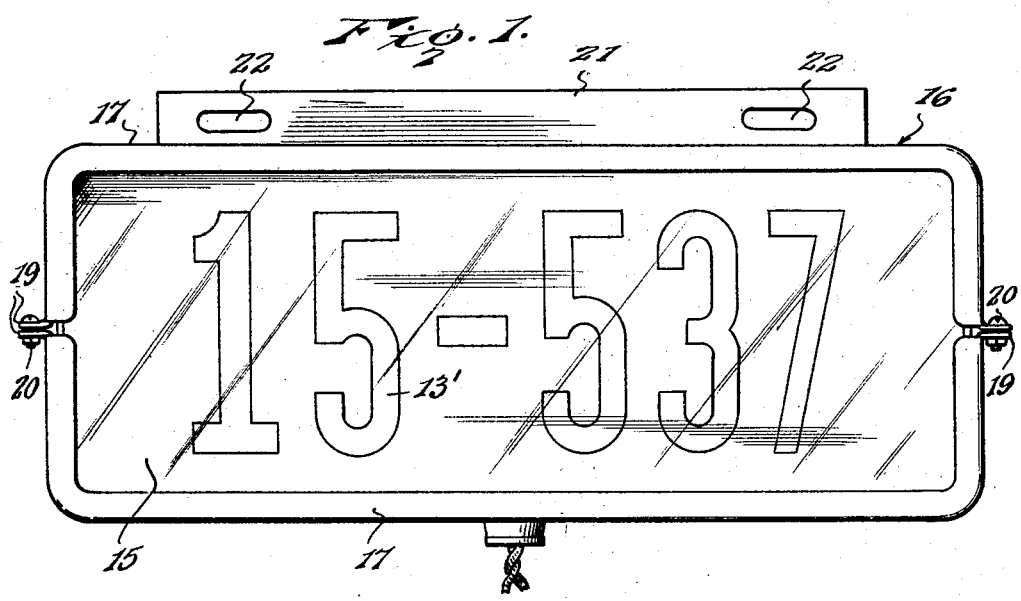
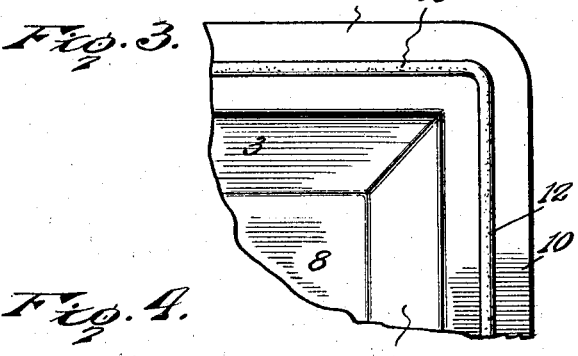
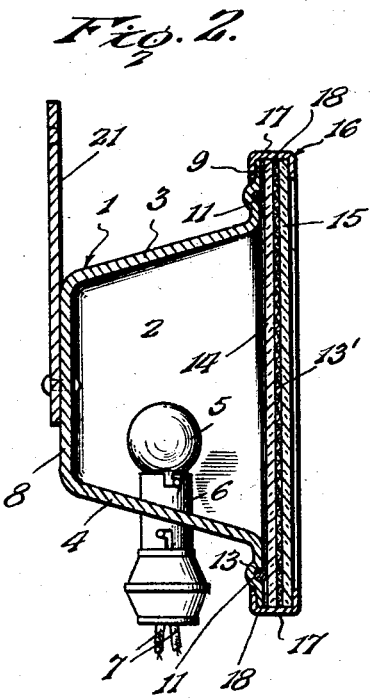
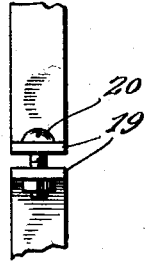
Inventor
D. Willman.
By Lacey & Lacey, Attorneys Patented June 30, 1931

1,811,989

UNITED STATES PATENT OFFICE

DANIEL WILLMAN, OF HARTFORD CITY, INDIANA

ILLUMINATED LICENSE HOLDER

Application filed March 20, 1929. Serial No. 348,545.

The present invention is directed to improvements in electrically illuminated license holders for motor vehicles.

The primary object of the invention is to provide a device of this character so constructed that the license number will be clearly legible at night or by day.

Another object of the invention is to provide a device of this character so constructed that the license number, when illuminated, will serve as a tail light or rear signal.

Another object of the invention is to provide a device of this type constructed in a manner to prevent entrance of dust or moisture into the interior of the casing.

Another object of the invention is to provide a device of this character which is simple in construction, durable, and one which can be manufactured at a small cost.

With these and other objects in view, this invention resides in the novel features of construction, formation, combination and arrangement of parts to be hereinafter more fully described, claimed and illustrated in the accompanying drawings, in which:—

Figure 1 is an elevation of the device as viewed from the rear of a vehicle.

Figure 2 is a transverse sectional view.

Figure 3 is a fragmentary plan view of one corner of the casing.

Figure 4 is a detail end view of the clamping frame and connection.

Referring to the drawings, 1 designates a casing formed from suitable sheet metal and consists of sloping end walls 2, a sloping top wall 3 and a sloping bottom wall 4. The inner surfaces of the respective walls are polished in order to reflect the light from the incandescent bulb 5, said bulb being engaged in a socket 6 carried by the bottom wall 4.

Electrical energy is furnished the bulb through the conductors 7, which lead from the electrical system of the vehicle.

The back 8 of the casing is connected with the top and bottom walls 3 and 4, as are the ends 2. The top and bottom walls 3 and 4 terminate in angularly disposed flanges 9 which merge with the flanges 10 of the end walls 2, said flanges being crimped to provide grooves 11 and 12, respectively, in which is placed a rubber packing 13, the purpose of which will be later explained.

A sheet of opaque fabric 13' is provided and has stenciled or cut therein the license number. This sheet may be formed from any suitable material, it being essential, that the rear face thereof be colored.

The sheet 13' is placed upon a glass panel 14, which may be of any desired color, after which the panel is placed against the flanges of the end wall and top and bottom walls, and in contact with the packing strip 13.

A clear glass panel 15 is placed upon the sheet 13', and since the sheet is arranged between the panels it will be maintained in a flat state.

In order to hold the panels 14 and 15 engaged with the casing and the sheet confined therebetween, I provide a clamping frame 16 which consists of complementary U-shaped sections 17, said sections being formed from sheet metal and are provided with channels 18. The ends of the sections are provided with ears 19 for engagement with the clamping bolts 20 which serve to hold the sections in place. Obviously when the margins of the flanges and the panels are engaged in the channels 18 of the sections they will be firmly clamped to the casing, but can be readily removed when it is necessary to make replacements.

The inner or rear flanges of the clamp frame sections 17 engage the rearwardly crimped portions of the flanges 9 and 10 and ride thereon, as shown most clearly in Figure 2 of the drawings, with the result that the clamp frame 15 is drawn inward and clamps the sheet 13' between the panels 14 and 15 and the latter against the flanges 9 and 10, as will be readily appreciated.

Riveted or otherwise suitably secured to the back 8 is a plate 21 having slots 22 formed therein for the passage of bolts which serve to secure the plate to a bracket carried by a part of the vehicle.

The clamping frame 16 will hold the panel 14 tightly engaged with the packing strip 13, thus assuring a tight joint to prevent entrance of dust and moisture into the interior of the casing.

The panel 15 is preferably colored red so that when the bulb 5 is glowing the license number will be prominently displayed and will also function as a tail light, thus proving exceedingly efficient at night.

It will be of course understood that the sheet 13' and panel 14 may be of any color desired in order that the color will meet with the requirements of the State issuing the license.

From the foregoing, it is thought that the construction, operation, and many advantages of the herein described invention will be apparent to those skilled in the art, without further description, and it will be understood that various changes in the size, shape, and proportion and minor details of construction, may be resorted to without departing from the spirit or sacrificing any of the advantages of the invention.

What is claimed is:—

A combined tail light and number display for motor vehicles comprising a casing having an open side and an outwardly disposed flange at the open side in which is formed a crimp to provide a groove upon the forward side and a projection upon the rear side of said flange, a packing in the groove, a panel placed against the said outer flange and extending over the open side of the casing, a sectional clamp frame of channel formation embracing the outer edge portions of the panel and casing flange, and means connecting and drawing together the sections of the clamp frame to cause the rear flange of the channel clamp frame to ride upon the said rear projection to clamp the panel against the outer flange of the casing.

In testimony whereof I affix my signature.

DANIEL WILLMAN. [L. S.]